US012069012B2

United States Patent
Curry et al.

(10) Patent No.: US 12,069,012 B2
(45) Date of Patent: Aug. 20, 2024

(54) INTERACTIVE CONTEXTUAL EMOJIS

(71) Applicant: Cisco Technology, Inc., San Jose, CA (US)

(72) Inventors: Stewart Curry, Booterstown (IE); Andrew Henderson, Spiddal (IE); Keith Griffin, Oranmore (IE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/579,247

(22) Filed: Jan. 19, 2022

(65) Prior Publication Data

US 2022/0217105 A1 Jul. 7, 2022

Related U.S. Application Data

(63) Continuation of application No. 16/895,294, filed on Jun. 8, 2020, now Pat. No. 11,245,650, which is a continuation of application No. 15/150,445, filed on May 10, 2016, now Pat. No. 10,680,980.

(51) Int. Cl.
*H04L 51/043* (2022.01)
*H04L 51/10* (2022.01)

(52) U.S. Cl.
CPC ............ *H04L 51/043* (2013.01); *H04L 51/10* (2013.01)

(58) Field of Classification Search
CPC ....... H04L 51/043; H04L 51/02; H04L 51/04; H04L 51/07–10
See application file for complete search history.

(56) References Cited

U.S. PATENT DOCUMENTS

| | | | |
|---|---|---|---|
| 7,448,546 B2 | 11/2008 | Jung et al. | |
| 7,539,724 B1 | 5/2009 | Callaghan | |
| 8,032,125 B2 | 10/2011 | Wisebourt et al. | |
| 8,352,555 B2 | 1/2013 | Channabasavaiah | |

(Continued)

FOREIGN PATENT DOCUMENTS

| | | |
|---|---|---|
| CN | 101729433 A | 6/2010 |
| WO | 2004107631 A2 | 12/2004 |
| WO | WO2015167120 | 11/2015 |

OTHER PUBLICATIONS

Allsopp, Ashleigh; Apple Watch: How To Send and Rply To Text Messages (Apr. 27, 2015).

(Continued)

*Primary Examiner* — Boris D Grijalva Lobos
(74) *Attorney, Agent, or Firm* — Polsinelli P.C.

(57) ABSTRACT

A method for communicating in a digital conversation is implemented on a computing device and includes: receiving an interactive contextual emoji from a first digital conversation participant to post in the digital conversation with at least a second digital conversation participant, where the interactive contextual emoji is pre-defined to indicate at least a current availability status associated with the first digital conversation participant, requesting the current availability status from a status application based on at least an indication of the interactive contextual emoji, where the status application maintains the current availability status, receiving the current availability status from the status application, and displaying the interactive contextual emoji in the digital conversation with at least an indication of the current availability status.

21 Claims, 10 Drawing Sheets

(56) References Cited

U.S. PATENT DOCUMENTS

| | | | |
|---|---|---|---|
| 9,060,050 | B1 | 6/2015 | Chau et al. |
| 9,405,610 | B1 | 8/2016 | Bailey et al. |
| 9,729,528 | B2 | 8/2017 | Zakaria et al. |
| 10,505,875 | B1* | 12/2019 | Jenks ............... H04L 51/02 |
| 2004/0133638 | A1 | 7/2004 | Doss et al. |
| 2005/0223328 | A1* | 10/2005 | Ashtekar ............ H04N 21/235 |
| | | | 715/977 |
| 2007/0276909 | A1 | 11/2007 | Chavda et al. |
| 2008/0201419 | A1 | 8/2008 | Hung et al. |
| 2009/0049125 | A1 | 2/2009 | Channabasavaiah |
| 2010/0049808 | A1* | 2/2010 | Rosenberg ............ G06Q 10/10 |
| | | | 709/204 |
| 2010/0125811 | A1 | 5/2010 | Moore et al. |
| 2012/0054646 | A1 | 3/2012 | Hoomani et al. |
| 2012/0290954 | A1* | 11/2012 | Qureshi ............... H04L 51/04 |
| | | | 715/758 |
| 2013/0159432 | A1 | 6/2013 | Deering et al. |
| 2013/0203393 | A1 | 8/2013 | Bugalia et al. |
| 2013/0227439 | A1* | 8/2013 | Shin ................. G06Q 10/107 |
| | | | 715/758 |
| 2013/0268606 | A1* | 10/2013 | Jindal ............... H04L 51/02 |
| | | | 709/206 |
| 2014/0278677 | A1* | 9/2014 | Tischhauser ....... G06Q 10/1095 |
| | | | 705/7.19 |
| 2014/0288990 | A1 | 9/2014 | Moore et al. |
| 2014/0337751 | A1* | 11/2014 | Lim .................. G06F 40/279 |
| | | | 715/744 |
| 2014/0357240 | A1* | 12/2014 | Choi ................... H04W 4/16 |
| | | | 455/414.1 |
| 2015/0006695 | A1 | 1/2015 | Gupta |
| 2015/0334075 | A1 | 11/2015 | Wang et al. |
| 2015/0350118 | A1 | 12/2015 | Yang et al. |
| 2016/0042324 | A1* | 2/2016 | Johnson ............. G06Q 10/1095 |
| | | | 705/7.19 |
| 2016/0112362 | A1* | 4/2016 | Perazzo ......... G06Q 10/063114 |
| | | | 455/466 |
| 2016/0255186 | A1 | 9/2016 | Kaneblai Martins Costa et al. |
| 2016/0350719 | A1 | 12/2016 | Wang et al. |
| 2017/0147919 | A1 | 5/2017 | Lee et al. |
| 2017/0324576 | A1 | 11/2017 | Jain et al. |
| 2018/0373683 | A1 | 12/2018 | Hullette et al. |

OTHER PUBLICATIONS

Galligan, Matt; Imagining Messagekit; Apple's Path To Turning Imessage Into a Platform (Jun. 9, 2015); 11 pages. Can be seen at: https://medium.com/@mg/there-s-a-cjat-for-that-apple-s-biggest-platform-opportunity-yet-19d5b1870857.

Kermode, Robin; Emoji Invasion: the End of Language as We Know It:/ (Jun. 25, 2015); 2 PAGES.

MOTT; Nathaniel; Cola Builds a Messaging App To Enhance Your Conversations (Nov. 15, 2015); 5 pages. Can be seen at: https://gigaom.com/2015/11/12/cola-builds-a-messaging-app-to-enhance-your-conversation/.

Paulos, Eric; Connexus: a Communal Interface in Proceedings of The 2003 Conference on Designing for User Experiences (2003); 6 PAGES.

SIINE Ltd., Siine Shortcut Keyboard—Use of Emoticon Keyboard To Have Shortcuts for Text Phrases (2015) 3 pages. Can be seen at: https://play.google.com/store/apps/details?id=com.siine.ime.

Slack Help Center; Emoji Reactions (2015); 2 pages. Can be seen at: https://slack.zendesk.com/hc/an-US/articles/206870317-Emoji-reactions.

* cited by examiner

INTERACTIVE CONTEXTUAL EMOJIS

CROSS-REFERENCE TO RELATED APPLICATION

This application is a continuation of U.S. patent application Ser. No. 16/895,294, filed on Jun. 8, 2020, which in turn, is a continuation of U.S. patent application Ser. No. 15/150,445 filed on May 10, 2016, now U.S. Pat. No. 10,680,980, the contents of which are incorporated by reference in their entirety.

FIELD OF THE INVENTION

The present invention generally relates to the use of interactive contextual emojis in an ongoing digital conversation.

BACKGROUND OF THE INVENTION

Instant messaging (IM) and collaboration applications provide real-time text communication, often called "posts" or "chats", between two or more participants, thereby supporting a "digital conversation" between the participants over a communications network, such as, for example, the Internet. Such applications often support the use of "emojis", i.e., digital images or icons that represent an emotion or state of a conversation participant, which may be selected from a menu and/or translated from a textual input.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for communicating in a digital conversation is implemented on a computing device and includes: receiving an interactive contextual emoji from a first digital conversation participant to post in the digital conversation with at least a second digital conversation participant, where the interactive contextual emoji is pre-defined to indicate at least a current availability status associated with the first digital conversation participant, requesting the current availability status from a status application based on at least an indication of the interactive contextual emoji, where the status application maintains the current availability status, receiving the current availability status from the status application, and displaying the interactive contextual emoji in the digital conversation with at least an indication of the current availability status.

A method for communicating in a digital conversation is implemented on a computing device and includes: receiving an interactive contextual emoji from a first digital conversation participant to post in the digital conversation with at least a second digital conversation participant, where the first digital conversation participant is an Internet of Things (IoT) device and the second digital conversation participant is a user of the computing device, where the interactive contextual emoji is pre-defined to indicate at least a status associated with the IoT device; and displaying the interactive contextual emoji in the digital conversation.

DETAILED DESCRIPTION OF EXAMPLE EMBODIMENTS

It will be appreciated that the usefulness of an emoji is a function of the manner in which it is interpreted and understood by the user on the receiving end. For example, if a receiving user does not recognize a particular emoji and cannot figure out its intended meaning it may be of no value to an ongoing digital conversation. Even worse, if the user misinterprets the intended meaning of an emoji, it may have negative impact on the ongoing digital conversation.

Furthermore, even if the receiving user recognizes an emoji, it will be appreciated that the interpretation of the emoji does not occur in a vacuum.

Specifically, the receiving user's understanding of the intended meaning of the emoji may be affected by temporal or contextual influences. For example, the sending user may send an emoji indicating laughter to the receiving user to indicate how the sending user's feelings about a joke in a movie they are both watching on television. But if some time passes before the receiving user actually sees the emoji, the receiving user may not remember or understand the context according to which it was originally sent. Emojis may therefore not be "contextually robust", their usefulness may vary as time passes and current context for the sending and receiving users' changes. In accordance with embodiments described herein, interactive contextual emojis may be provided to support contextually robust use of emojis.

Figure 1:
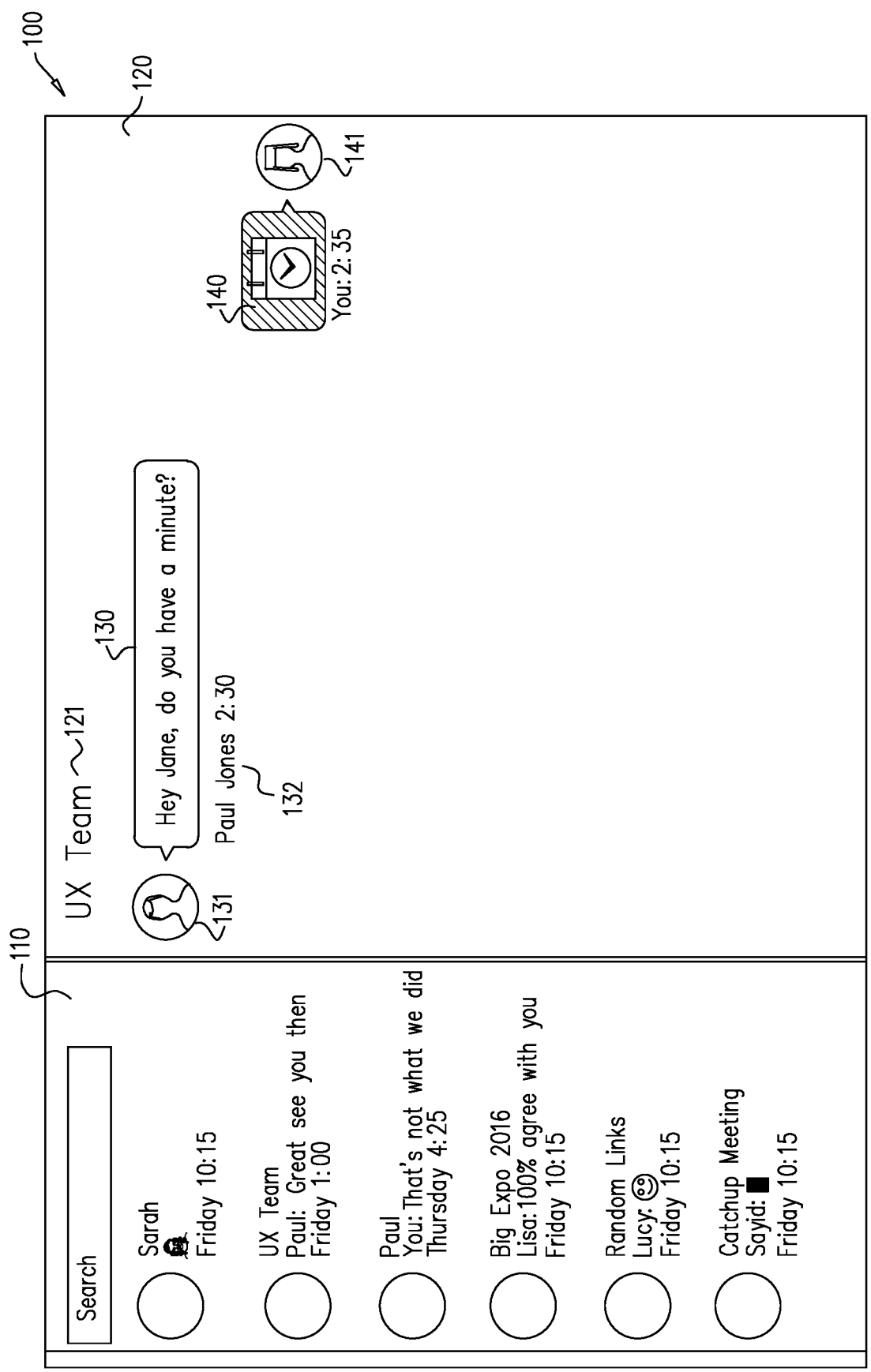
FIGS. 1-6 are simplified pictorial illustrations of a display of an exemplary digital conversation application, constructed and operative in accordance with embodiments described herein.

Reference is now made to FIG. 1 which is a simplified pictorial illustration of an exemplary digital conversation application display 100, constructed and operative in accordance with embodiments described herein. Display 100 may represent an application display for a collaboration application, such as Cisco Spark® that supports digital conversations between multiple participants. It will be appreciated that the embodiments described herein may be implemented within the context of other applications that support digital conversations, such as, for example, Facebook® or WhatsApp®.

Display 100 comprises conversation panel 110 and conversation details panel 120. Conversation panel 110 may include a list of digital conversations in which a user of display 100 is a participant. Conversation details panel 120 may provide a display of the details of one of the digital conversations from conversation panel 110. For example, as depicted in FIG. 1, conversation details panel 120 may comprise the details of a conversation 121, i.e., a digital conversation between members of the "UX Team". Conversation details panel 120 may also comprise one or more participant posts 130 and/or one or more user posts 140.

It will be appreciated by those of ordinary skill in the art that posts with a right justified format may typically be associated with a user of display 100, whereas posts with a left justified format may typically be associated with other participants of the digital conversation. Accordingly, participant post 130 is associated with participant avatar 131 and participant name 132, i.e., according to the exemplary embodiment of FIG. 1, participant post 130 was posted by "Paul Jones", a participant in the UX Team digital conversation. User post 140 is associated with user avatar 141 and in accordance with the exemplary embodiment of FIG. 1, user post 140 was posted by the user of display 100.

As depicted in FIG. 1, participant post 130 is textual, and presents a question to the user of display (i.e., "Jane" as per the example) regarding current availability: " . . . do you have a minute?" User post 140 represents a non-textual response to this question, an icon showing an image of a clock superimposed on a calendar. In accordance with embodiments described herein, user post 140 may be an interactive contextual emoji. As an interactive contextual emoji, user post 140 may be associated with a value for an updatable contextual state of the user, such as, for example, a current availability status, as per an associated application.

For example, in addition to, or instead of, typically available emojis such as "smileys" and the like, the user of display 100 may be presented with an option to post an interactive contextual emoji to provide a less ambiguous representation of a current availability status than may be understood from a typical emoji. An interactive contextual emoji may be associated with a current availability status as per a status application. Common examples of status applications include, but are not limited to, scheduling application such as Microsoft Outlook® or a conferencing application such as Cisco WebEx. The user of display 100 may use an application programming interface (API) to request the current availability status from the associated status application. The current availability status may then be "translated" into an interactive contextual emoji for presentation on display 100. It will be appreciated that this translation may be performed by either the associated status application or display 100, depending on configurable settings.

As per the exemplary embodiment of FIG. 1, the status of the user of display 100 may be "in a meeting". Accordingly, the image of a clock superimposed on a calendar in user post 140 may indicate that the user is in a meeting as a response to the question posed in participant post 130.

Figure 2:
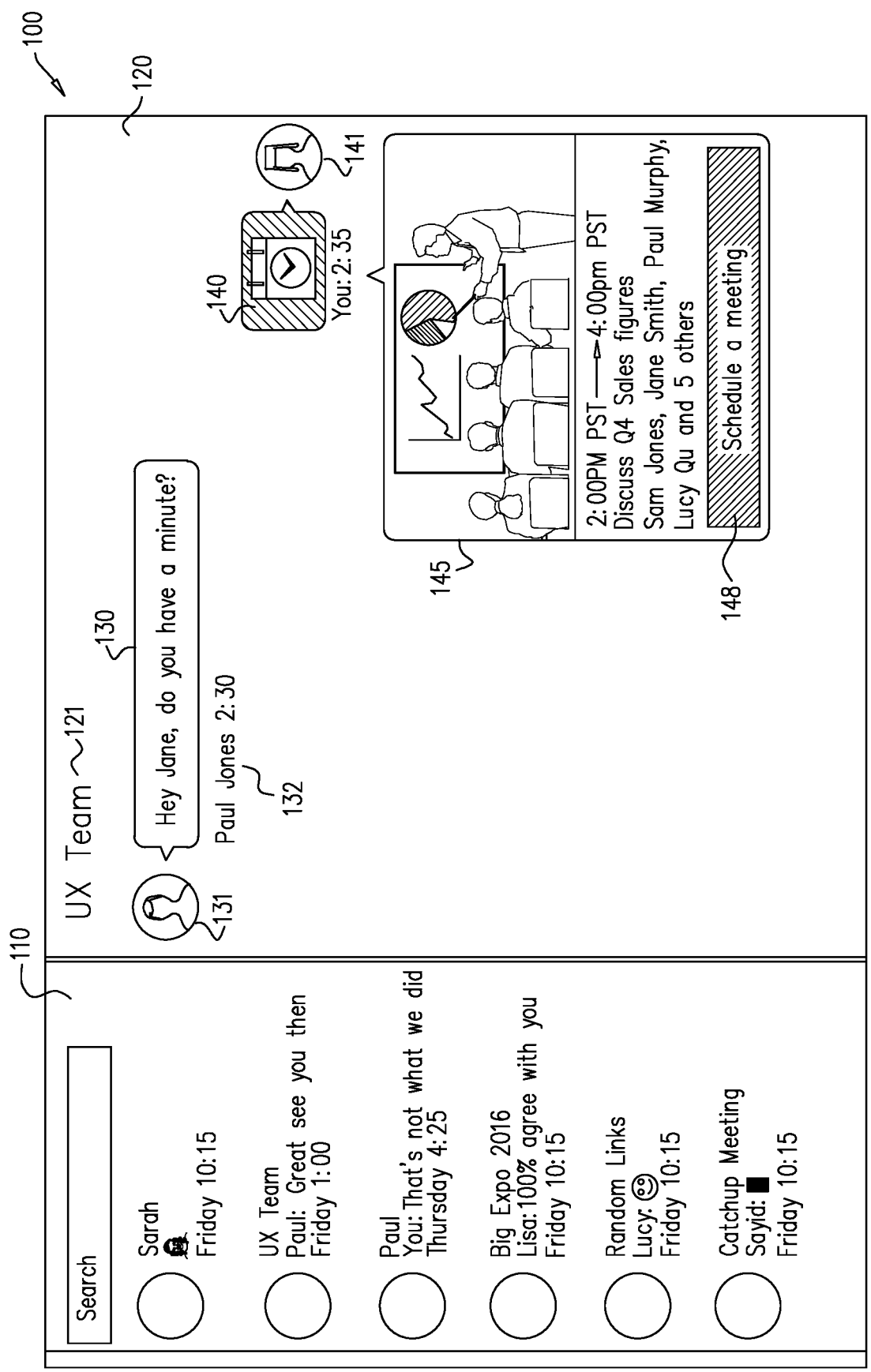

It will be appreciated that the meaning of the image displayed in user post 140 may, in and of itself, be subject to interpretation. However, as discussed hereinabove, user post 140 may be an interactive contextual emoji, and as such, it may be configured to provide additional, unambiguous information. Reference is now made to FIG. 2 which depicts another view of display 100. It will be appreciated that similar reference numerals refer to similar elements. It will also be appreciated that while the representation of FIG. 2 may be consistent with display 100 as viewed by the user associated with user avatar 141 (i.e., in accordance with the convention that a user's posts are right justified and everyone else's are left justified), the same elements may be viewed by the user associated with participant avatar 131. In the interests of continuity and clarity, FIGS. 1 and 2 as well and other figures referred to herein may all be presented with the same general justification (i.e., participant avatar 131 on the left and user avatar on the right 141), whereas in practice, the justification may be otherwise when presented on display 100, depending on the role played by the user of display 100.

In accordance with embodiments described herein, a user may use a user interface (UI) gesture to request additional details regarding the associated user's availability status. For example, depending on the configuration of the device on which display 100 is provided, the user may "mouse-over" or tap on user post 140. It will be appreciated by one of ordinary skill in the art that the specific UI gesture used may be configurable.

In accordance with the exemplary embodiment of FIG. 2, display 100 may present contextual status 145 in response to such a UI gesture. As depicted, contextual status 145 provides additional details regarding the availability of the associated user, including, for example, the time scheduled for the meeting, the topic of the meeting, and a partial list of the attendees of the meeting. It will be appreciated by a person of ordinary skill in the art that these additional details are exemplary, in practice the actual additional details displayed may be configurable and/or subject to the functionality provided by the API used to access the associated status application.

In accordance with embodiments described herein, contextual status 145 may also comprise interactive option 148. Interactive option 148 may represent a selectable option for a user to launch the associated status application to schedule a meeting for a different time.

Figure 3:
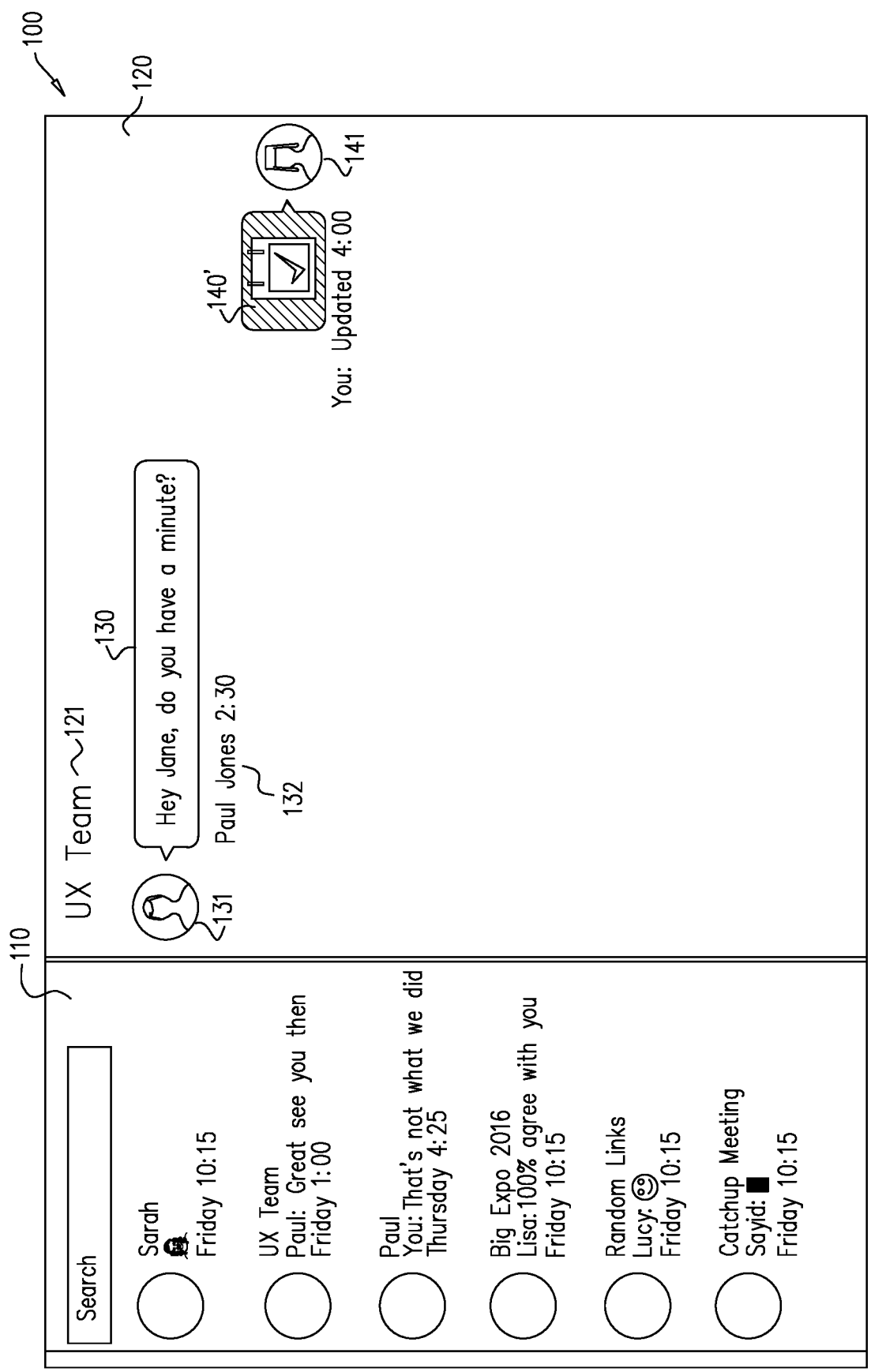

Reference is now made to FIG. 3; similar reference numerals refer to similar elements. In accordance with embodiments described herein, the status application may provide status updates for the user of display 100. For example, as depicted in FIG. 3, when the meeting indicated by user post 140 (FIGS. 1 and 2) finishes, user post 140 may be updated to user post 140' which has a checkmark superimposed on the image of a calendar, thereby indicating that the user's meeting has completed, and the user is presumably free to chat/meet/speak for the time being.

In accordance with some embodiments described herein, the user's current availability status may update autonomously as per the original schedule received from the status application. For example, if per the original schedule the associated user was scheduled to be in a meeting until 4:00 PM, at 4:00 PM user post 140 may be updated to user post 140'. Alternatively, the update of the user's availability status may also be facilitated by the API used to access the associated status application. Alternatively, or in addition, an Internet bot may also be used to track the user's availability status and/or other contexts. It will similarly be appreciated that the "timing" and/or direction of the use of the API may also be configurable. For example, depending on the configuration, the updated information may be pulled from the status application, or pushed by the status application. Similarly, the push/pull may be scheduled (e.g., on a periodic basis), or may be event driven (e.g., push when the status changes, or pulled when the status is scheduled to change), or a combination thereof.

Figure 4:
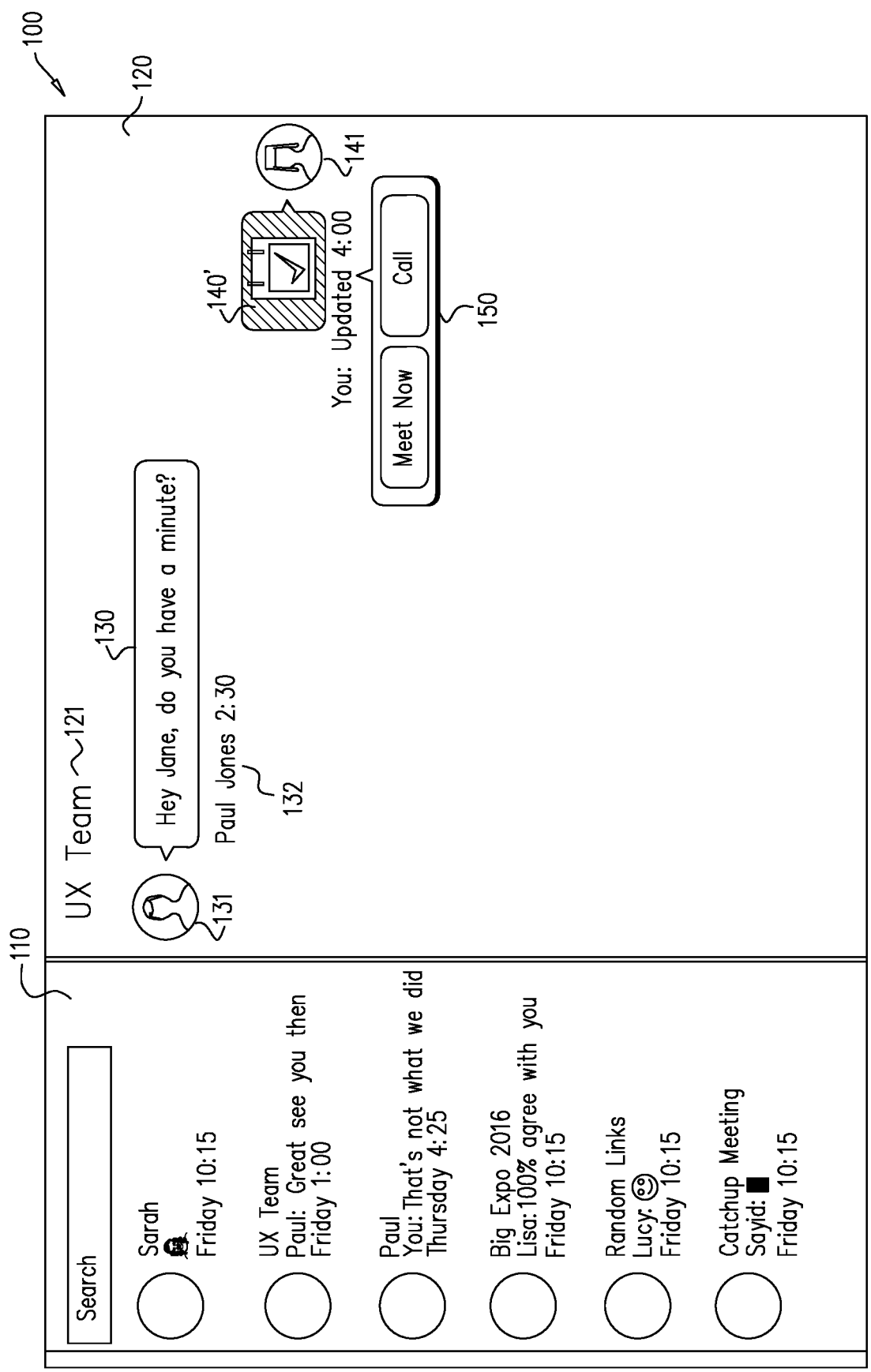

Reference is now made to FIG. 4 which depicts another view of display 100. It will be appreciated that similar reference numerals refer to similar elements. Similar to the discussion of the embodiment of FIG. 2, in accordance with embodiments described herein, a user may use a user interface (UI) gesture to request additional details regarding the associated user's availability status. For example, depending on the configuration of the device on which display 100 is provided, the user may "mouse-over" or tap on user post 140'. It will be appreciated by one of ordinary skill in the art that the specific UI gesture used may be configurable.

In accordance with the exemplary embodiment of FIG. 4, display 100 may present interactive option 150 in response to such a UI gesture. Interactive option 150 may be generally similar to interactive option 148 (FIG. 2) in that it may represent a selectable option for a user to launch the associated status application. However, whereas interactive option 148 may be used to schedule future communications, since per the update of user post 140' the meeting in which the user associated with user avatar 140 was participating has now ended, interactive option 150 may be used to initiate a call or meeting without delay.

Figure 5:
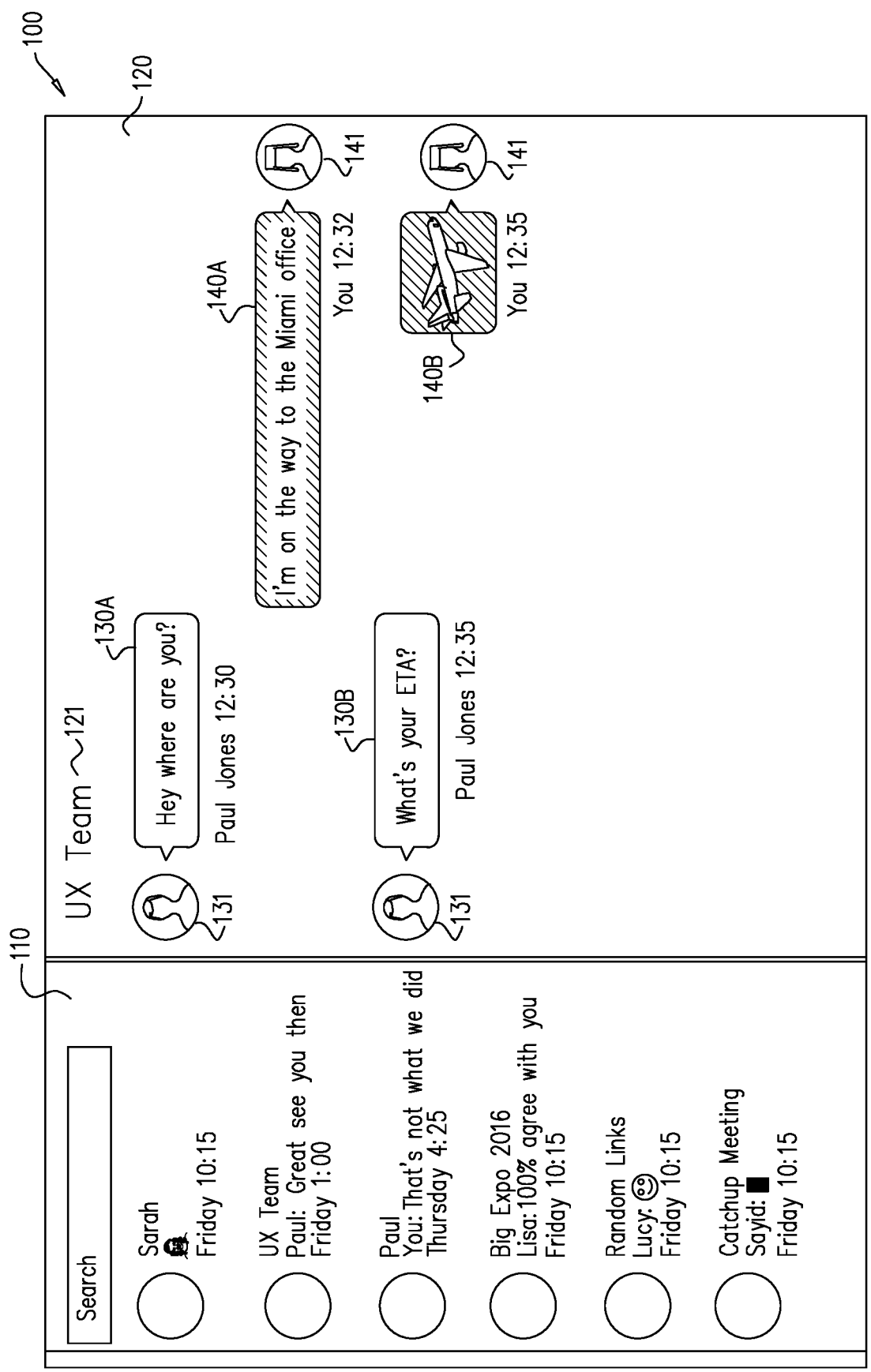

Reference is now made to FIG. 5 which depicts another view of display 100. It will be appreciated that similar reference numerals refer to similar elements. In accordance with an exemplary embodiment, participant posts 130A and 130B may represent a somewhat different type of status inquiry than participant post 130 of FIGS. 1-4. For example, instead of inquiring if the user of display 100 is available to meet, participant post 130A asks " . . . where are you?" Per user post 140A the answer may be textual: " . . . on the way to the Miami office." Participant post 130B may then ask for further details: "What's your ETA?" In response the user of display 100 may select an interactive contextual emoji to be provided as user post 140B. In accordance with the exemplary embodiment of FIG. 5, user post 140B may be an interactive contextual emoji that represents the user's status as per an airline reservation system.

Figure 6:
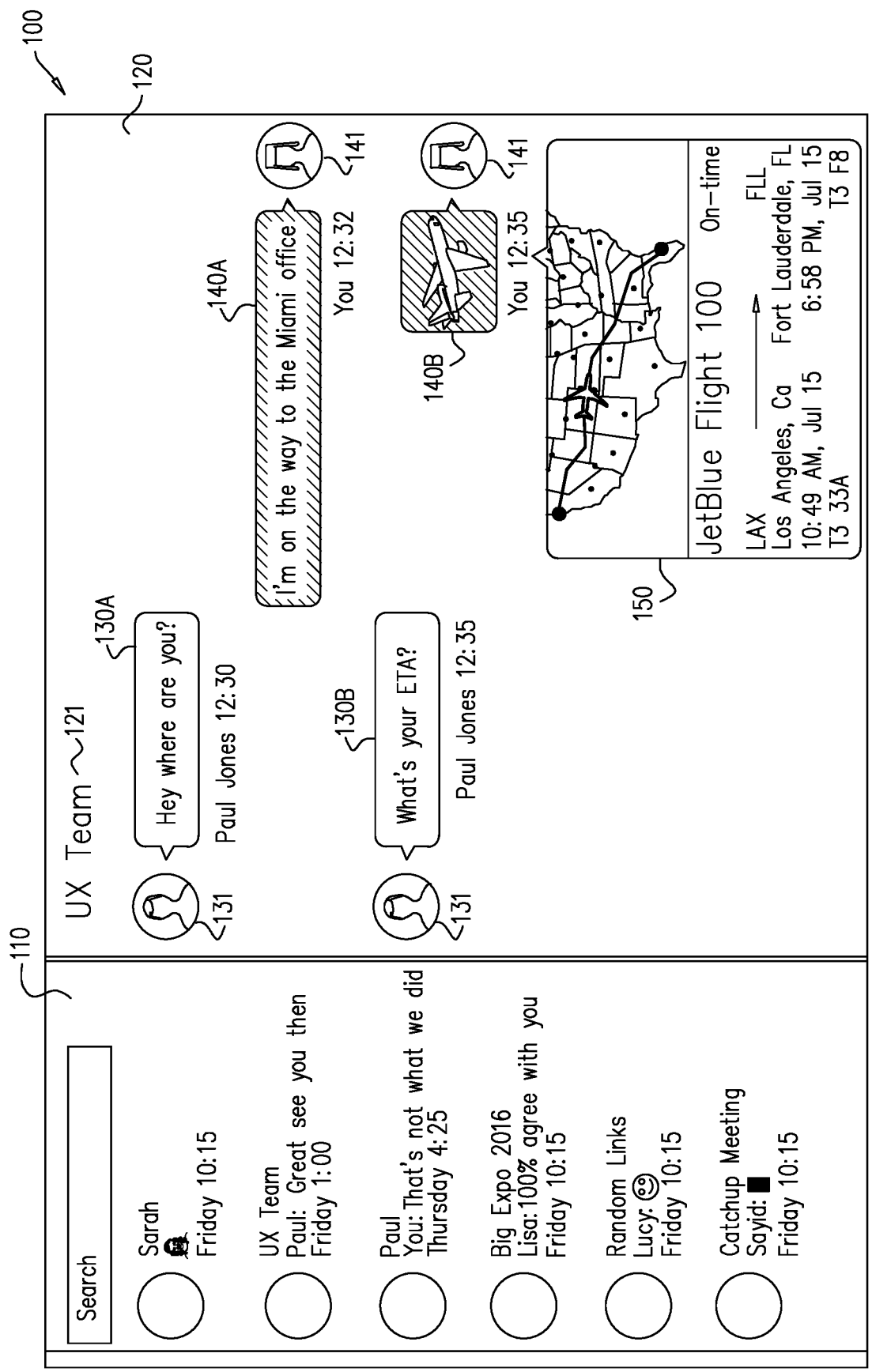

Reference is now made to FIG. 6 which depicts another view of display 100. It will be appreciated that similar reference numerals refer to similar elements. In accordance with embodiments described herein, a user may use a user interface (UI) gesture to request additional details regarding the associated user's availability status. For example, depending on the configuration of the device on which display 100 is provided, the user may "mouse-over", tap, or right-click on user post 140B. It will be appreciated by one of ordinary skill in the art that the specific UI gesture used may be configurable. It will similarly be appreciated that in some configurations, keypresses and/or menu selections may be used.

In accordance with the exemplary embodiment of FIG. 6, display 100 may present contextual status 150 in response to such a UI gesture. As depicted, contextual status 150 provides additional details regarding the availability of the associated user, including, for example, the time/date scheduled for the flight, the flight destination, etc. It will be appreciated by a person of ordinary skill in the art that these additional details are exemplary, in practice the actual additional details displayed may be configurable and/or subject to the functionality provided by the API used to access the associated status application.

Figure 7:
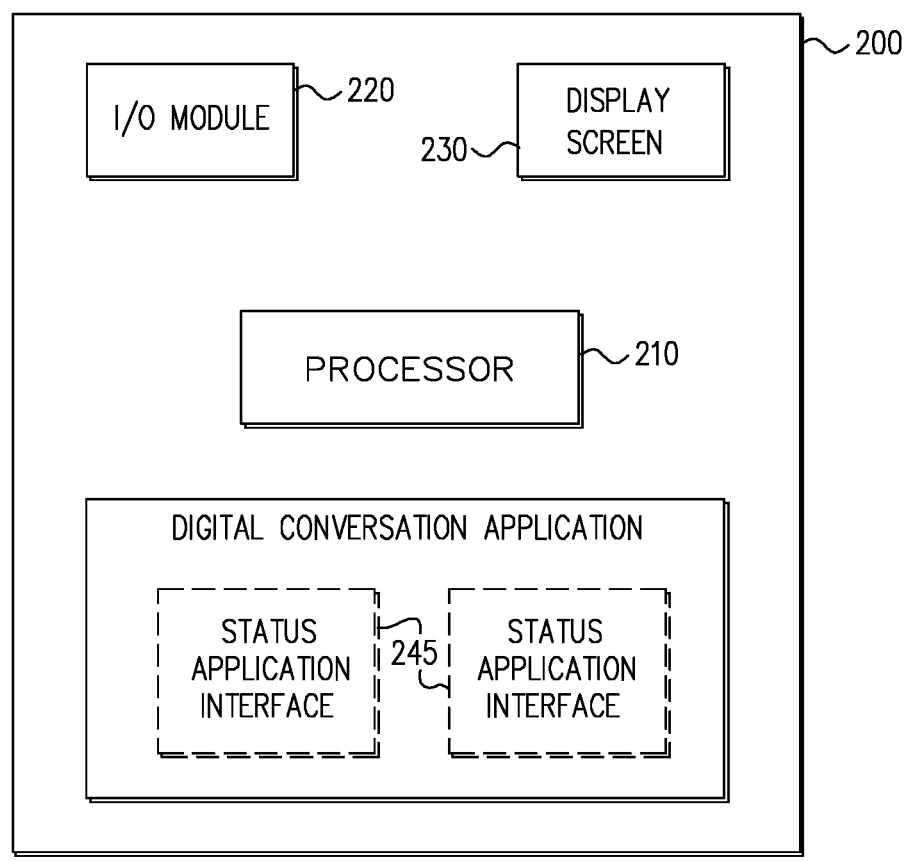
FIG. 7 is a block diagram of a computing device operative to run the exemplary digital conversation application of FIGS. 1-6.

Reference is now made to FIG. 7 which is a block diagram of a computing device 200 constructed and operative in accordance with embodiments described herein to provide an exemplary digital conversation application configured to present display 100 as described with respect to FIGS. 1-6. It will be appreciated by one of ordinary skill in the art that the format of display 100 as presented in the exemplary embodiments of FIGS. 1-6 may be generally consistent with the presentation of a digital conversation application on a computer tablet. However, it will be similarly appreciated that computing device 200 may be implemented as any suitable computing device such as, but not limited to, a personal computer, laptop computer, computer tablet, or smartphone that may be operative to provide the functionality described hereinabove with reference to FIGS. 1-6. The presentation format of display 100 may be modified to conform to the physical constraints of a given type of computing device 200, but the overall functionality may remain generally consistent with the description provided hereinabove.

It will be appreciated by one of skill in the art that computing device 200 comprises hardware and software components that may provide at least the functionality of the embodiments described herein. For example, computing device 200 may comprise at least processor 210, I/O module 220, display screen 230, and digital conversation application 240. I/O module 220 may be implemented as a transceiver or similar means suitable for transmitting and receiving data between computing device 200 and another device. Such data may be, for example, participant posts 130 and/or user posts 140 (FIGS. 1-6). In accordance with some embodiments described herein, display screen 230 may be implemented as a touchscreen to detect the direct input of UI gestures, however, as noted hereinabove, menu selections and/or mouse clicks may be used to compensate for a lack of touchscreen functionality. It will be appreciated that display screen 230 may be implemented as a built-in integrated component of computing device 200, or alternatively as an attached peripheral device.

Digital conversation application 240 may be any suitable application implemented in software and/or hardware that may be operative to facilitate a user's ongoing participation in a digital conversation as described hereinabove. For example, digital conversation application 240 may be implemented as Cisco Spark®. It will, however, be appreciated that application 240 may be implemented within the context of any suitable IM, collaboration, and/or social network application that supports ongoing conversations between multiple participants, such as, for example, Jabber®, WhatsApp®, or Facebook®.

It will be appreciated that computing device 200 may comprise more than one processor 210. For example, one such processor 210 may be a special purpose processor operative to execute digital conversation application 240. Digital conversation application 240 comprises one or more status application interfaces 245. Status application interfaces 245 may be implemented in software and/or hardware and may be employed as necessary by digital conversation application 240 to communicate with external status applications (not shown) typically via I/O module 220. It will be appreciated by one of ordinary skill in the art that some or all of the functionality of digital conversation application 240 and/or status application interfaces 245 may be implemented on a conversation server (not shown) that may be configured to facilitate digital conversations between digital conversation applications 240 on different computing devices 200. For example, the conversation server may store some or all of the conversation history displayed in display 100 as described hereinabove. The conversation server may also broker communications with the status applications to reduce processing requirements for computing device 200. For example, the conversation server may handle pushing/pulling of updates for interactive contextual emojis and only push a new status to computing device 200 if/when the previous status changes.

Figure 8:
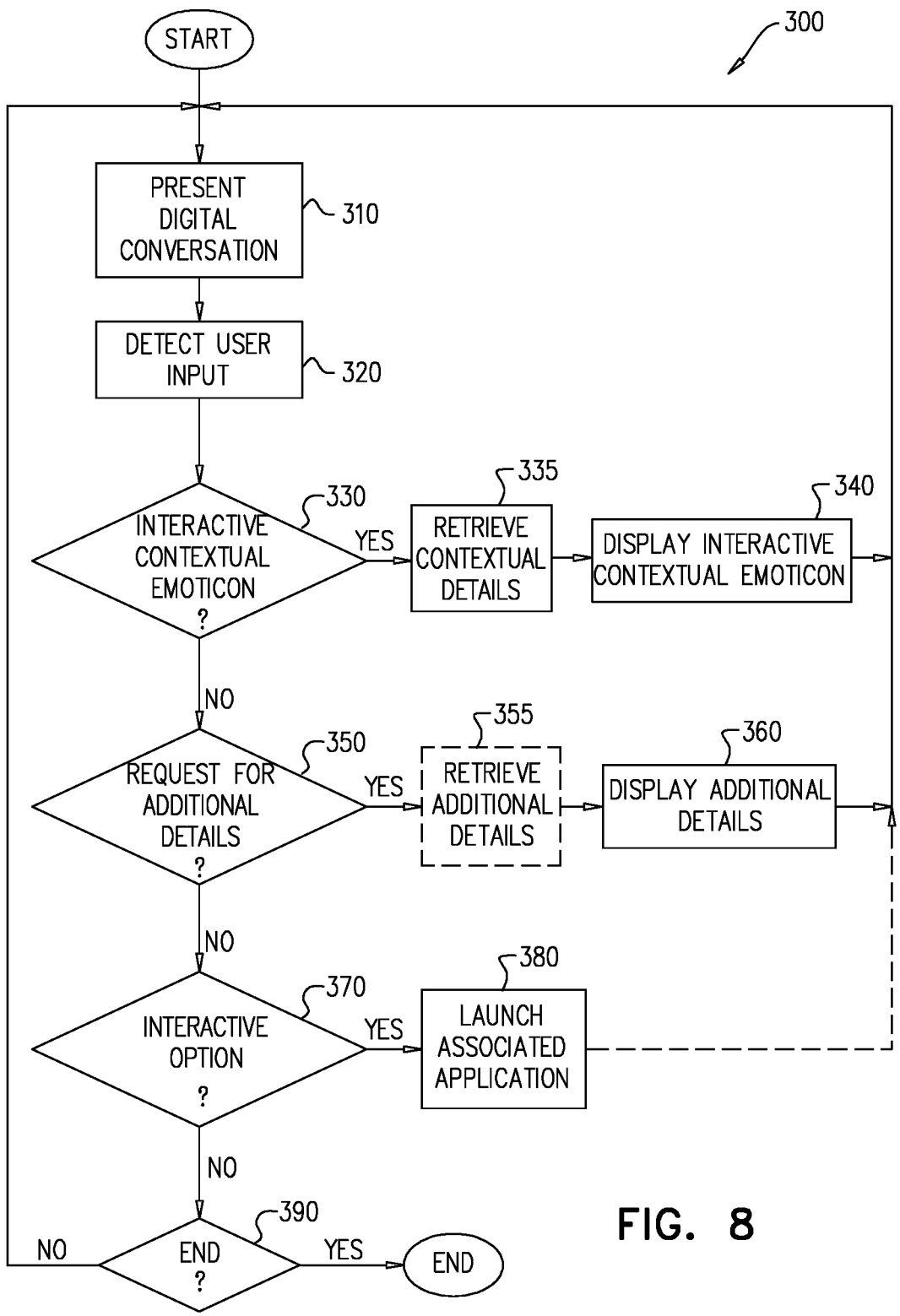
FIG. 8 is a flowchart of an exemplary interactive contextual emoji process to be executed on the computing device of FIG. 7 within the context of the exemplary digital conversation application of FIGS. 1-6.

Reference is now made to FIG. 8 which illustrates an interactive contextual emoji process 300, constructed and operative in accordance with embodiments described herein. Process 300 may be used by digital conversation application 240 (FIG. 7) to employ contextual interactive emojis in an ongoing digital conversation. It will be appreciated by one of ordinary skill in the art that process 300 may represent a process for providing interactive contextual emojis in an ongoing digital conversation. Digital conversation application 240 may employ other processes to provide typical digital conversation functionality. Digital conversation application 240 may use such other processes to present (step 310) a digital conversation, such as display 100 from FIGS. 1-6 on display screen 230.

Digital conversation application 240 may detect (step 320) user input from the user of computing device 200. It will be appreciated that process 300 may be configured to detect and recognize any suitable UI gesture, or combination of UI gestures (step 320). Non-limiting examples of such UI gestures may include: a tap, double tap, menu selection, mouse click, or double click. It will be appreciated that in addition to the functionality described hereinabove for interactive contextual emojis, digital conversation application 240 may be operative to process a variety of UI gestures in order to present and execute display 100. In any case, it will be appreciated that the following description of process 300 may address the processing of UI gestures and/or any other suitable methods of user input that may be concerned with the presentation and operation of interactive contextual emojis.

Accordingly, if the detected user input represents the selection of an interactive contextual emoji (step 330) such as user posts 140 (FIGS. 1-6), digital conversation application 240 may invoke an interactive context interface 245 to retrieve (step 335) the associated interactive context from the associated status application. For example, when entering user post 140, the user of display 100 may select an interactive contextual emoji using generally similar methods as known methods for using emojis in a digital conversation. The user may enter text or symbols that are recognized by digital conversation application 340 to represent an interactive contextual application, much in the same way that ":)" may commonly be interpreted and subsequently displayed as a "smiley" face by commercially available IM and collaboration applications. Alternatively, the user may select a particular interactive contextual emoji from a list of available interactive contextual emojis provided by digital conversation application 240, much in the same way that many commercially available IM and collaboration applications provide a list of emojis for selection in response to a button/menu selection. Alternatively, or in addition, the interactive contextual emojis may be presented along with non-interactive contextual emojis in a single list.

As described hereinabove, an interactive contextual emoji may be associated with a status context in a status application. For example, as per the exemplary embodiment of FIGS. 1-4, the interactive contextual emoji of user posts 140 may be associated with a meeting scheduler application such as, for example but not limited to, Microsoft Outlook®. Interactive context interface 245 (FIG. 7) may communicate with an Outlook client and/or an associated server to receive a current status context for the associated user. As shown in the exemplary embodiment of FIG. 1, the user may be scheduled to be in a meeting. Accordingly digital conversation client 240 may display (step 340) user post 140 as an image of a calendar with a super-imposed clock to indicate that the associated user is busy.

After user post 140 has been displayed, processing control may return to step 310.

If the detected user input represents a request for additional details (step 350), digital conversation application 340 may display (step 360) the additional details. For example, as described hereinabove the user may use a UI gesture such as, for example, a mouse over, tap, right-click, keypress and/or menu selection to request additional details regarding user posts 140.

As noted hereinabove, a number of options may be employed by digital conversation application 240 to update the user's current availability status. If, for example, status application interface 245 is set to communicate with the status application on an "as needed" basis in response to request for additional details such as in step 350, digital conversation application 240 may invoke status application interface 245 to communicate with the status application to retrieve (step 355) the requested details. It will be appreciated that status application interface 245 may also update the user's status at the same time.

It will also be appreciated, however, that if status application interface 245 is configured to pull such information on a periodic scheduled basis, it may not be necessary to perform step 355. In such a case, or if the status application is configured to autonomously push the information to computing device 200, the functionality of step 355 may alternatively (or in addition) be included with step 310, i.e., as part of the ongoing presentation of display 100.

It will further be appreciated by one of ordinary skill in the art that there may be a configurable limit to how long digital conversation application 240 may continue to update the user's current availability status and/or the additional details of a scheduled event. For example, such activities may eventually "time out" after a day, week, month, etc., depending upon the configuration of digital conversation application 240 and/or the associated status application(s).

It will be appreciated that step 360 may also include displaying an updated user availability status as received by status application interface 245, and/or an interactive option such as, for example, interactive option 148 and 150 as per the embodiments of FIGS. 2 and 4. After the additional details have been displayed, processing control may return to step 310.

If the detected user input represents a selection of an interactive option (step 370) such as interactive options 148 or 150, digital conversation application 240 may launch (step 380) an instance of the status application (e.g., by invoking status application interface 245) to enable the user to complete the indicated action.

After the status application has been launched, processing control may return to step 310. However, it will be appreciated by one of ordinary skill in the art that depending on the configuration of computing device 200 and/or digital conversation application 240 and/or the status application, digital conversation application 240 may end or suspend when the status application is launched.

If the UI gesture represents a request to end (step 390), process 300 may end, and a next process may be performed. It will be appreciated that any suitable UI input may be configured to represent a request to end the process. For example, depending on the operating system and/or the presence of a touchscreen, mouse and/or keyboard, a request to end may be input via tapping an "end" button, a mouse click on a window close symbol (typically, although not necessarily an "X"), an ALT-F4 keystroke combination, selecting an application exit menu option, etc.

Otherwise, if the UI gesture cannot be parsed (as implied by a "No" result in step 390), control may return to step 310. It will be appreciated that process 300 may also support other functionality that in the interests of clarity has not been specifically detailed herein. For example, the user input detected in step 320 may represent known functionality for scrolling between participant posts 130 and/or user posts 140. It will therefore be appreciated that process 300 may also support receiving a scrolling request and adjusting/redisplaying the affected elements as necessary.

In view of the descriptions hereinabove, it will be appreciated that the disclosed interactive contextual emojis may maintain a persistent connection to a source for contextual state information. It will accordingly be appreciated that the use of interactive contextual emojis in digital conversations as described herein may provide dynamic (as opposed to the typically static) images, thereby adding to a more vibrant, alive conversational experience. Similarly, the interactive elements may provide relevant contextual information to support richer communication between the participants.

In accordance with embodiments described herein, interactive contextual emojis may also be used to provide connectivity between Internet of Things (IoT) devices and their users. As sensors drive more and more of internet traffic and the number of IoT devices increases, a real challenge may exist with regard to how humankind may communicate with billions of devices. Interactive contextual emojis may enable people to communicate with these sensors and devices in much the same way that people talk to other people. It will be appreciated that natural language interfaces such as Amazon ML (machine learning), Google Brain, Cortana, and Siri may help to some extent, but they are dependent on the speaker speaking out loud and not immune to accents. Emojis may be considered to be the new lingua franca of messaging, so it may be of benefit to leverage this informal, powerful and easily understandable language to communicate with IoT devices.

It would be of further benefit to enable users to communicate with IoT devices and interact with sensors using the same applications that many people are already using for most of their communication, i.e. IM or collaboration applications such as Spark or Facebook.

Accordingly the IP or email address (or any other suitable identifier) of an IoT device may be used to add the device to a messaging contact list in a similar fashion to adding contacts for a digital conversation application. The contact list associated with display 100 (FIGS. 1-6) may therefore contain both people and IoT devices which may act as participants in digital conversations.

In accordance with embodiments described herein, users may communicate with IoT devices in the form of a 1:1 chat with any of the IoT devices in an application contact list (e.g. refrigerator, thermostat, security camera, Internet bot, etc.). The user and device may communicate with each other using emojis, such as standard supported emojis.

Figure 9:
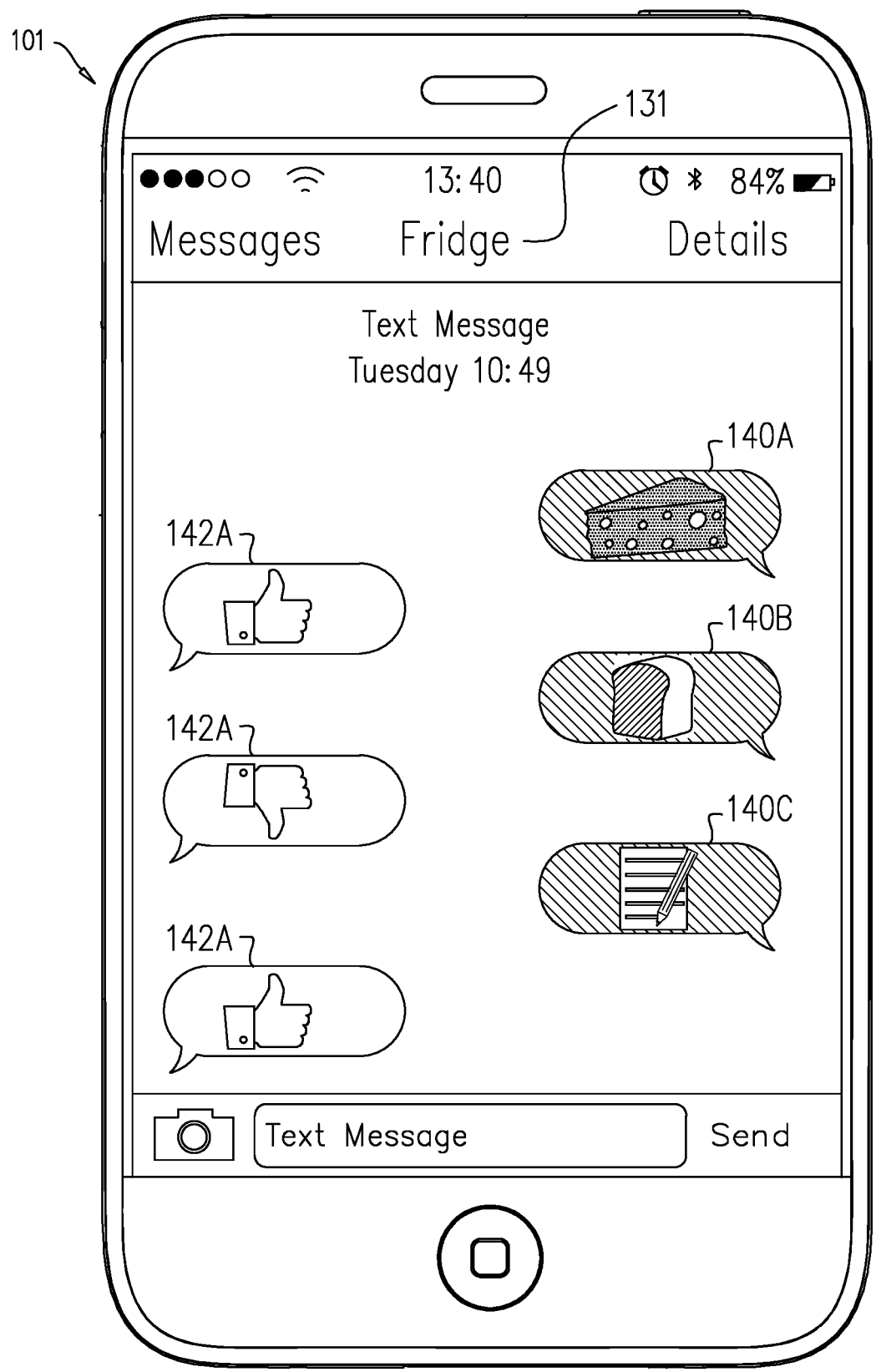
FIGS. 9 and 10 are simplified pictorial illustrations of another exemplary digital conversation application display, constructed and operative in accordance with embodiments described.

Reference is now made to FIG. 9 which is a simplified pictorial illustration of an exemplary digital conversation application display 101, constructed and operative in accordance with embodiments described herein. Display 101 is generally depicted in the context of a smartphone application. However, it will be appreciated by one of ordinary skill in the art that such depiction is exemplary; as with display 100 (FIGS. 1-6), may be presented on any suitable device as described hereinabove. Display 101 may be functionally similar to display 100. However, instead of conversations between a user and other people, display may represent a conversation between the user and an IoT device, i.e., a refrigerator per the exemplary embodiment of FIG. 9.

Display 101 comprises conversation participant 131 (i.e., "fridge"), user posts 140 and device posts 142. As depicted, user post 140A consists of an emoji with an image of a chunk of cheese. In accordance with an exemplary embodiment, this cheese emoji may be an interactive contextual emoji that may be configured to inquire whether or not there is cheese in the associated IoT device, i.e., the refrigerator. Device post 142A may represent the refrigerator's response to the inquiry of user post 140A. It will be appreciated that the "thumbs-up" image in device post 142A may be defined by display 101 to indicate a non-equivocal answer (i.e., with a single possible interpretation) in the context of user post 140A that "yes" there is cheese in the refrigerator.

As depicted, user post 140B consists of an emoji with an image of a bread. In accordance with an exemplary embodiment, this bread emoji may be an interactive contextual emoji that may be configured to inquire whether or not there is bread in the associated IoT device, i.e., the refrigerator. Device post 142B may represent the refrigerator's response to the inquiry of user post 140B. It will be appreciated that the "thumbs-down" image in device post 142B may be defined by display 101 to indicate a non-equivocal answer in the context of user post 140B that "no", there is no bread in the refrigerator.

As depicted, user post 140C consists of an emoji with an image of a shopping list. In accordance with an exemplary embodiment, this shopping list emoji may be an interactive contextual emoji that may be configured to request that the refrigerator add the previous item (i.e., bread) to a shopping list for future purchase. Device post 142C may represent the refrigerator's response to the request of user post 140C. It will be appreciated that the "thumbs-up" image in device post 142C may be defined by display 101 to indicate a non-equivocal answer in the context of user post 140C that "yes", bread is now on the shopping list.

In accordance with embodiments described herein, device posts 142 may also be interactive contextual emojis. For example, similar to the functionality of the embodiments of FIGS. 1-6, device posts 142 may also be updated in response to changes of status in the IoT device. For example, if subsequent to the posting of device post 142B, the spouse of the user of display 101 stocked the refrigerator with bread, device post 142B may be updated to show a thumbs-up image instead of thumbs-down image. It will be appreciated by one of ordinary skill in the art, that the updating of device post 142B may entail either updating of an already displayed image and/or replacement of some or all of the image.

Alternatively, or in addition, the IoT device may be operative to proactively initiate communication with the user of display 101 without being prompted by a request from the user. For example, the IoT device may proactively notify the user of display 101 regarding the status of a particular item. For example, the refrigerator may send device post 140 with an interactive contextual emoji whose image represents a loaf of bread super imposed with a red "X" to proactively indicate that there is no bread in the refrigerator.

It will be appreciated by one of ordinary skill in the art that the embodiment of FIG. 9 may assume that the exemplary IoT device, i.e., the refrigerator, is configured with the "intelligence" to properly interpret user posts 140 and to provide contextually relevant device posts 142. For example, the refrigerator may comprise a contextual engine operative to determine context to translate a received emoji to a device instruction; i.e., contextual analysis and rules that may interpret an emoji representing cheese to a specific inquiry for the device.

The refrigerator may also be operative to employ smart tagging of components to track inventory. For example, food in the refrigerator would have a smart label, e.g., RFID enabled, to identify the product, food type, expiry etc. The refrigerator may also be configured with an interactive user interface for the definition/assignment of emojis to represent particular food items.

Figure 10:
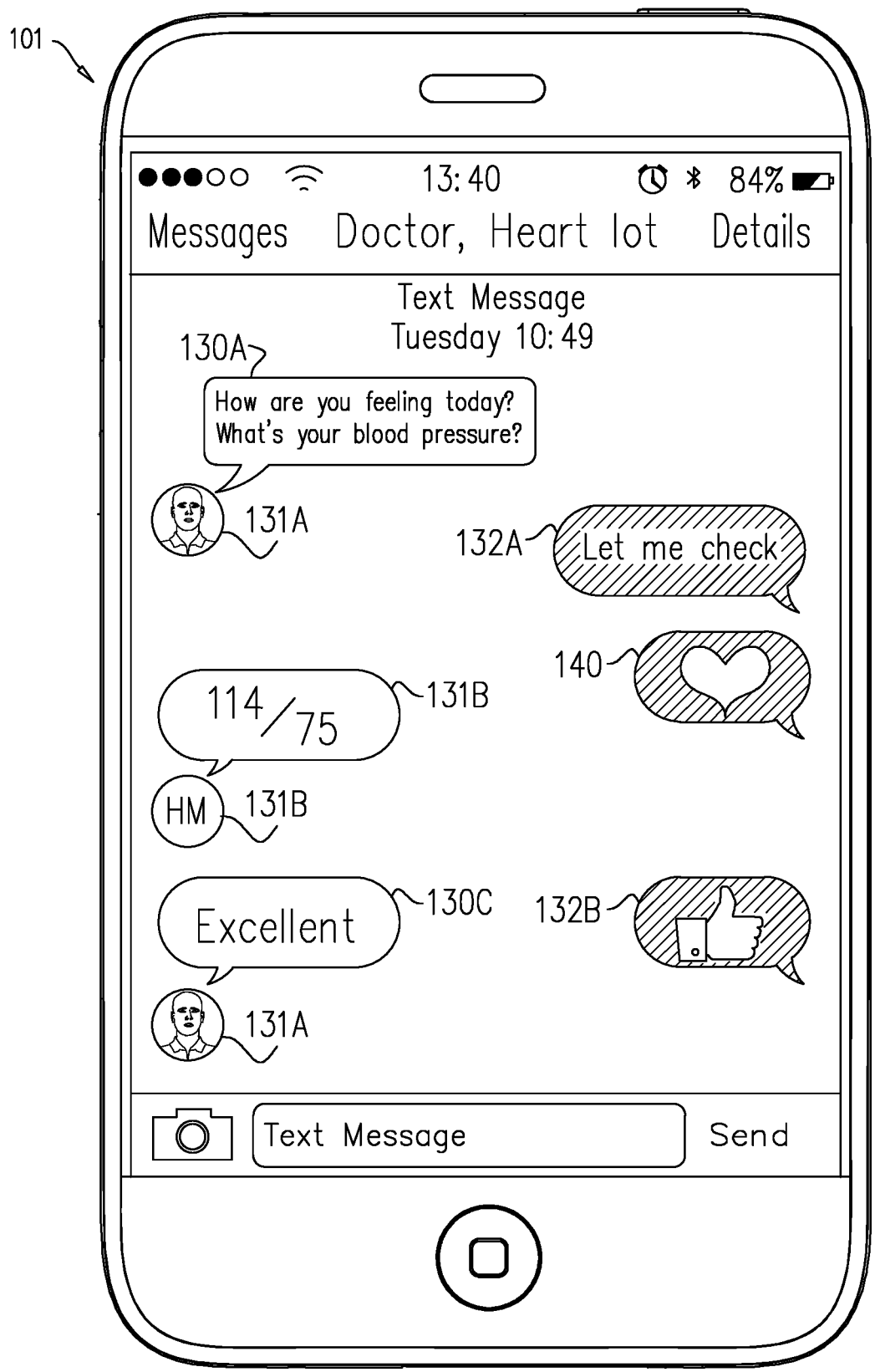

Reference is now made to FIG. 10 which is a simplified pictorial illustration of another view of exemplary digital conversation application display 101, constructed and operative in accordance with embodiments described herein. As depicted in FIG. 10, display 101 may support more than just 1:1 digital conversations between a user and an IoT device. For example, the digital conversation depicted in FIG. 10 may represent a group chat between a user, the user's doctor and the user's heart monitor (which monitors various health biometrics).

In the exemplary embodiment of FIG. 10, the user's doctor as indicated by participant avatar 131A asks the user a question about the user's blood pressure in participant post 130A. The user answers the doctor in user post 132A, and then uses an interactive contextual emoji with the image of a heart in user post 140 to send a query to the IoT device, i.e., the user's heart monitor. It will be appreciated that the IoT device has been configured to interpret user post 140 as a request to take the user's blood pressure. The heart monitor, as indicated by participant avatar 131B, posts the result in participant post 130B: '114/75'. The doctor and user may then continue the digital conversation with textual dialogue in participant post 130C and user post 132B.

It will be appreciated that in such manner digital conversation applications 131 may combine IoT APIs and sensor data with collaboration tools and messaging to allow natural communication between people and IoT devices in a way that's simple, universal, friendly and understandable.

In accordance with some embodiments described herein, an interactive contextual emoji may be user-defined for communication with an IoT device. For example, a user may take a photograph of the user's car and then define the photograph (or at least an image derived from the photograph) as an interactive contextual emoji for communication with the user's garage. It will be appreciated that such functionality may be implemented via an application programming interface (API) with the user's garage application.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for communicating in a digital conversation within an application panel using a computing device, the method comprising:
    providing first information to cause display, in the digital conversation application panel, of an interactive contextual emoji representing a first current status associated with a user sending the interactive contextual emoji, wherein the first current status is the sending user's status at a first time, and the first time corresponds to when the first information is provided;
    receiving a request for additional information associated with the first current status, wherein the request is responsive to an interaction with the interactive contextual emoji;
    providing, in response to the receiving of the request, second information to cause dispay of the additional information in the digital conversation application panel; and
    providing, in response to establishing a second current status associated with the sending user, third information to cause display of an updated interactive contextual emoji, in the digital conversation application panel, to represent the second current status associated with the sending user, wherein the second current status is different than the first current status, the updated interactive contextual emoji represents the second current status, the second current status is the sending user's status at a second time, and the second time corresponds to when the third information is provided.

2. The method according to claim 1, further comprising: requesting a current status from a status application; and receiving fourth information indicating second current status from the status application.

3. The method according to claim 2, wherein the fourth information is received based on a schedule.

4. The method according to claim 2, wherein the fourth information is received based at least in part upon a schedule determined by the status application.

5. The method according to claim 2, wherein the receiving of the fourth information includes:
    querying the status application for the current status, wherein the fourth information is provided in response to the querying.

6. The method according to claim 5, wherein the querying is performed at least according to a schedule received with the first current status.

7. The method according to claim 5, wherein the querying is performed periodically.

8. The method according to claim 1, further comprising:
    providing fourth information to cause display of an option to contact a status application;
    detecting selection of the option; and
    contacting the status application.

9. The method according to claim 8, wherein the status application supports scheduling a meeting with another user.

10. The method according to claim 1, wherein a message in the digital conversation application panel comprises the interactive contextual emoji.

11. The method according to claim 1, wherein the digital conversation is a real-time text communication.

12. The method according to claim 1, wherein the updated interactive contextual emoji replaces the displayed interactive contextual emoji in the digital conversation application panel.

13. The method according to claim 1, wherein the first current status relates to the sending user's current availability at the first time.

14. A system for communicating in a digital conversation within an application panel, the system comprising:
    one or more processors; and
    at least one non-transitory computer-readable medium containing instructions which, when executed by the one or more processors, cause the one or more processors to:

provide first information to cause display, in the digital conversation application panel, of an interactive contextual emoji representing a first current status associated with a user sending the interactive contextual emoji, wherein the first current status is the sending user's status at a first time, and the first time corresponds to when the first information is provided;

receive a request for additional information associated with the first current status, wherein the request is responsive to an interaction with the interactive contextual emoji;

provide, in response to the receiving of the request, second information to cause display of the additional information in the digital conversation application panel; and provide, in response to establishing a second current status associated with the sending user, third information to cause display of an updated interactive contextual emoji, in the digital conversation application panel, to represent the second current status associated with the sending user, wherein the second current status is different than the first current status, the updated interactive contextual emoji represents the second current status, the second current status is the sending user's status at a second time, and the second time corresponds to when the third information is provided.

15. The system according to claim 14, wherein the at least one non-transitory computer-readable medium contains instructions which, when executed by the one or more processors, cause the one or more processors to:

request a current status from a status application; and
receive fourth information indicating the second current status from the status application.

16. The system according to claim 15, wherein, to receive the fourth information, the at least one non-transitory computer-readable medium contains instructions which, when executed by the one or more processors, cause the one or more processors to:

query the status application for the current status, wherein the fourth information is provided in response to the querying.

17. The system according to claim 14, wherein the digital conversation is a real-time text communication.

18. A non-transitory computer-readable medium containing instructions which, when executed by one or more processors, cause the one or more processors to:

provide first information to cause display, in a digital conversation application panel, of an interactive contextual emoji representing a first current status associated with a user sending the interactive contextual emoji, wherein the first current status is the sending user's status at a first time, and the first time corresponds to when the first information is provided;

receive a request for additional information associated with the first current status, wherein the request is responsive to an interaction with the interactive contextual emoji;

provide, in response to the receiving of the request, second information to cause display of the additional information in the digital conversation application panel; and provide, in response to establishing a second current status associated with the sending user, third information to cause display of an updated interactive contextual emoji, in the digital conversation application panel, to represent the second current status associated with the sending user, wherein the second current status is different than the first current status, the updated interactive contextual emoji represents the second current status, the second current status is the sending user's status at a second time, and the second time corresponds to when the third information is provided.

19. The non-transitory computer-readable medium according to claim 18, containing instructions which, when executed by the one or more processors, cause the one or more processors to:

request a current status from a status application; and
receive fourth information indicating the second current status from the status application.

20. The non-transitory computer-readable medium according to claim 19, containing instructions which, when executed by the one or more processors, cause the one or more processors to:

query the status application for the current status in order to receive the fourth information, wherein the fourth information is provided in response to the querying.

21. The non-transitory computer-readable medium according to claim 18, wherein the digital conversation is a real-time text communication.

* * * * *